(12) United States Patent
Choudhry et al.

(10) Patent No.: US 11,354,497 B2
(45) Date of Patent: Jun. 7, 2022

(54) METHOD AND APPARATUS FOR SERVICING WEBPAGE REQUESTS

(71) Applicant: Walmart Apollo, LLC, Bentonville, AR (US)

(72) Inventors: Vikas Choudhry, Burlingame, CA (US); Amit Agarwal, Sunnyvale, CA (US); Alfonso Acevedo, San Francisco, CA (US); Avery Armour, San Francisco, CA (US); Anthony Soohoo, Palo Alto, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/247,481

(22) Filed: Jan. 14, 2019

(65) Prior Publication Data

US 2020/0226207 A1    Jul. 16, 2020

(51) Int. Cl.
*G06F 40/197* (2020.01)
*G06F 16/953* (2019.01)
*H04L 67/02* (2022.01)
*G06F 40/14* (2020.01)

(52) U.S. Cl.
CPC .......... *G06F 40/197* (2020.01); *G06F 16/953* (2019.01); *G06F 40/14* (2020.01); *H04L 67/02* (2013.01)

(58) Field of Classification Search
CPC ..... H04L 67/02; H04L 67/22; H04L 67/2833; H04L 67/2842; H04L 41/0668; G06F 16/95; G06F 16/907; G06F 40/197; G06F 16/953; G06F 40/14; G06F 16/957
See application file for complete search history.

(56) References Cited

U.S. PATENT DOCUMENTS

| 8,285,602 | B1 | 10/2012 | Yi et al. |
| 8,965,998 | B1* | 2/2015 | Dicker ............... G06Q 30/0633 709/217 |
| 9,301,015 | B2 | 3/2016 | Lenahan et al. |
| 11,188,353 | B2* | 11/2021 | Byard .................... G06F 16/951 |
| 2002/0065721 | A1 | 5/2002 | Lerna et al. |

(Continued)

OTHER PUBLICATIONS

Cyber Monday: The Season's best deals—no fighting for parking, no waiting in line, just lean back, put your feet up and shop. (Nov. 25, 2011) Business Wire Retrieved from https:///dialog.proquest.com/professional/docview/1069547633?accountid=161862, 201, 3 pages.

*Primary Examiner* — Ariel Mercado
(74) *Attorney, Agent, or Firm* — Duane Morris LLP; Manita Rawat (57) ABSTRACT

A webpage serving system is provided and generally includes a server and a computing device. The server can receive a webpage request from the computing device, and determine a type of webpage being requested. The server may provide a document, such as an HTML document, to the computing device based on the type of webpage. The document may include instructions to download a particular bundle, which may include one or more files, from a server. The bundle identified in the instructions may be based on the type of webpage the document is for. The customer computing device may receive the requested bundle, and display the requested webpage based on the information received in the document and in the bundle.

20 Claims, 6 Drawing Sheets

(56) References Cited

U.S. PATENT DOCUMENTS

| | | | |
|---|---|---|---|
| 2011/0044354 A1* | 2/2011 | Wei | H04L 41/0816 370/468 |
| 2013/0138767 A1* | 5/2013 | Vecera | H04L 67/02 709/217 |
| 2013/0318208 A1* | 11/2013 | Seshadri | H04L 67/02 709/219 |
| 2014/0281918 A1* | 9/2014 | Wei | H04L 67/02 715/234 |
| 2015/0088968 A1* | 3/2015 | Wei | G06F 40/14 709/203 |
| 2015/0134491 A1 | 5/2015 | Ostroff | |
| 2015/0161717 A1 | 6/2015 | Deleuran Mumm et al. | |
| 2015/0363872 A1 | 12/2015 | Weinhold et al. | |
| 2016/0283592 A1* | 9/2016 | Mi | G06F 16/9535 |
| 2017/0270208 A1 | 9/2017 | Spathelf | |
| 2018/0267847 A1* | 9/2018 | Smith | G06F 40/221 |
| 2019/0266227 A1* | 8/2019 | Kirn | G06F 40/143 |

\* cited by examiner

METHOD AND APPARATUS FOR SERVICING WEBPAGE REQUESTS

CROSS-REFERENCE TO RELATED APPLICATIONS

This application is related to U.S. application Ser. No. 16/247,474 filed on Jan. 14, 2019, which is hereby incorporated by reference in its entirety.

TECHNICAL FIELD

The disclosure relates generally to providing webpages and, more specifically, to providing webpages in response to webpage requests.

BACKGROUND

Web servers are known to host websites on a network, such as the Internet. A web server may host one or more websites, where each website may include one or more webpages. By executing a web browser, a computing device, such as a computer, may access a webpage hosted by a web server. For example, a user may request a webpage by entering into an address bar of a web browser the web address of a webpage, and in response the web browser may retrieve the webpage from the webpage's hosting web server. In some cases, the webpage retrieved from the web server includes instructions to download additional information. The additional information may be hosted by the web server that hosts the retrieved webpage, or by a different web server. The amount of time it takes a web browser to display a webpage is at least partially affected by the amount of information the webpage requires to be downloaded. The amount of time it takes to load a webpage may depend on the amount or information being downloaded for that webpage. A customer visiting a retailer's website may not have the patience or time for a webpage to load if the webpage takes too long to load. Moreover, productivity efficiencies, such as work productivity efficiencies, are lessened as the time required to load webpages increases. As such, for these and other reasons, there are opportunities to improve webpage providing methods and systems.

SUMMARY

The embodiments described herein may allow for faster loading of webpages compared to conventional methods. As a result, the embodiments may allow for an improved user experience with the webpage. For example, a customer visiting a retailer's website may be more willing to interact with the webpage as the webpage load time decreases. As another example, users interacting with the webpages for work purposes, such as for ordering supplies from a retailer's website, may increase their work productivity as they will spend less time waiting for the webpages to load. Other benefits would also be recognized by those skilled in the art.

For example, in some embodiments, a computing device is configured to receive a webpage data request for a webpage. The webpage data request may be received from a web browser executing on a remote device, for example. The computing device may determine, based on the webpage data request, a webpage type for the webpage. The computing device may also determine, based on the webpage type, a document to be rendered to display the webpage, where the document identifies a bundle corresponding to the webpage type. The computing device may then transmit the document identifying the bundle to display the webpage. For example, the computing device may transmit the document to the web browser.

In some examples, the computing device may determine whether the webpage type for the webpage is a first webpage type or a second webpage type. The computing device may identify the bundle based on the webpage type, and determine the document based on the identified bundle. In some examples, the computing device may identify a first bundle corresponding to the first webpage type if the webpage type for the webpage is the first webpage type, and identify a second bundle corresponding to the second webpage type if the webpage type for the webpage is the second webpage type. The computing device may insert instructions into the document identifying the first bundle corresponding to the first webpage type if the webpage type for the webpage is the first webpage type. The computing device may insert instructions into the document identifying the second bundle corresponding to the second webpage type if the webpage type for the webpage is the second webpage type.

In some embodiments, a method by a computing device includes receiving a webpage data request for a webpage and determining, based on the webpage data request, a webpage type for the webpage. The method may also include determining, based on the webpage type, a document to be rendered to display the webpage, where the document identifies a bundle corresponding to the webpage type. The method may further include transmitting the document identifying the bundle to display the webpage.

In some examples, the method may include determining whether the webpage type for the webpage is a first webpage type or a second webpage type. The method may also include identifying the bundle based on the webpage type, and determining the document based on the identified bundle. For example, the method may include identifying a first bundle corresponding to the first webpage type if the webpage type for the webpage is the first webpage type, and identifying a second bundle corresponding to the second webpage type if the webpage type for the webpage is the second webpage type. The method may also include inserting instructions into the document identifying the first bundle corresponding to the first webpage type if the webpage type for the webpage is the first webpage type. The method may also include inserting instructions into the document identifying the second bundle corresponding to the seconds webpage type if the webpage type for the webpage is the second webpage type.

In some examples a non-transitory, computer-readable storage medium includes executable instructions that, when executed by one or more processors, cause the one or more processors to perform operations including receiving a webpage data request for a webpage and determining, based on the webpage data request, a webpage type for the webpage. The operations may also include determining, based on the webpage type, a document to be rendered to display the webpage, where the document identifies a bundle corresponding to the webpage type. The operations may further include transmitting the document identifying the bundle to display the webpage.

In some examples, the operations may include determining whether the webpage type for the webpage is a first webpage type or a second webpage type. The operations may also include identifying the bundle based on the webpage type, and determining the document based on the identified bundle. For example, the operations may include identifying a first bundle corresponding to the first webpage type if the webpage type for the webpage is the first webpage type, and identifying a second bundle corresponding to the second webpage type if the webpage type for the webpage is the second webpage type. The operations may also include inserting instructions into the document identifying the first bundle corresponding to the first webpage type if the webpage type for the webpage is the first webpage type. The operations may also include inserting instructions into the document identifying the second bundle corresponding to the second webpage type if the webpage type for the webpage is the second webpage type.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Figure 1:
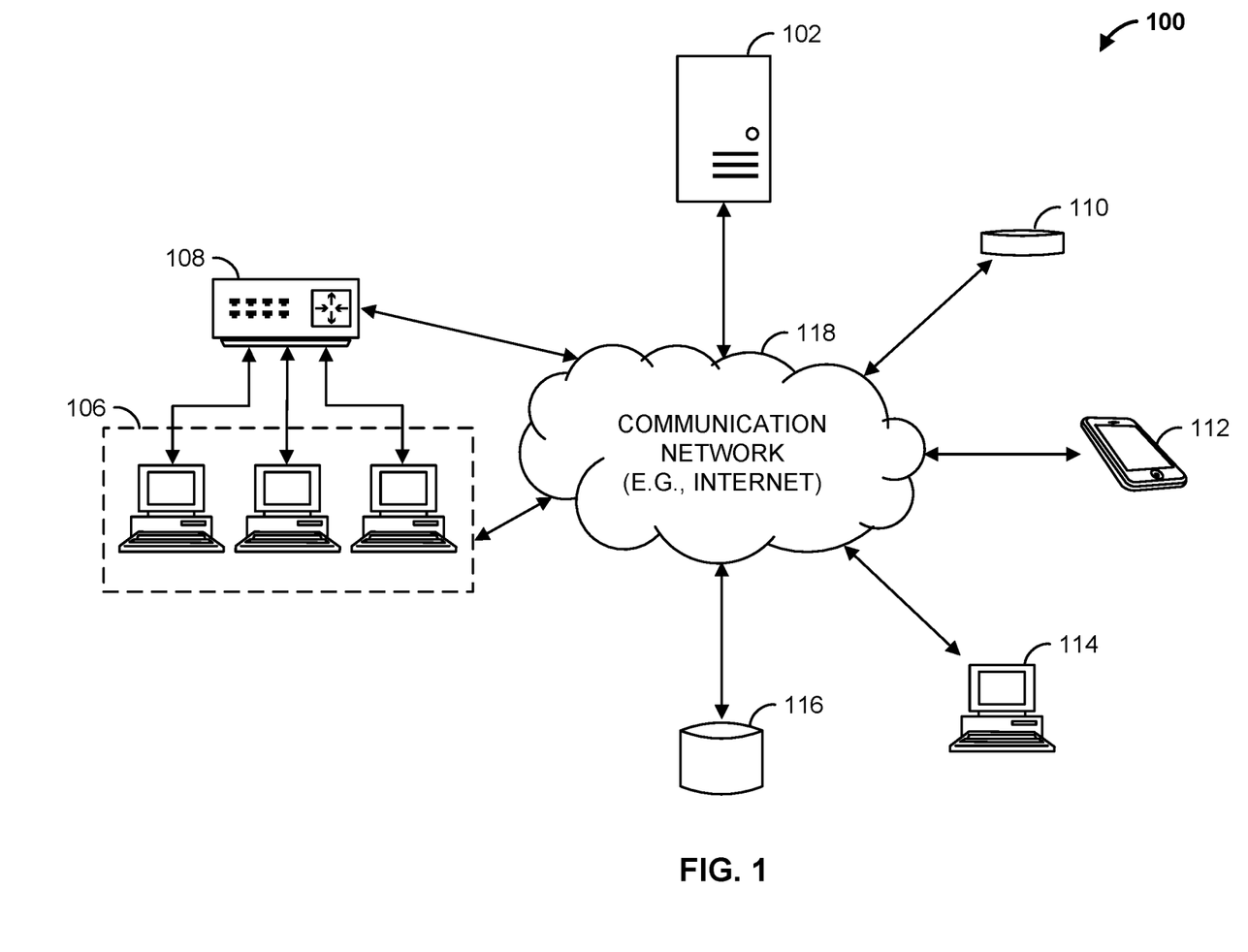
FIG. 1 is a block diagram of a webpage serving system, in accordance with some embodiments.

Turning to the drawings, FIG. 1 illustrates a block diagram of a web serving system 100 that includes a server 102 (e.g., a web server), workstation(s) 106, database 116, and multiple customer computing devices 110, 112, 114 operatively coupled over network 118. Server 102 and multiple customer computing devices 110, 112, 114 can each be any suitable computing device that includes any hardware or hardware and software combination for processing and handling information. In addition, each can transmit data to, and receive data from, communication network 118.

For example, server 102 can be a computer, a workstation, a laptop, a mobile device such as a cellular phone, a cloud-based server, or any other suitable computing device. Each of multiple customer computing devices 110, 112, 114 can be a mobile device such as a cellular phone, a laptop, a computer, a tablet, a personal assistant device, a voice assistant device, a digital assistant, or any other suitable computing device.

Additionally, each of server 102 and multiple customer computing devices 110, 112, 114 can include one or more processors, one or more field-programmable gate arrays (FPGAs), one or more application-specific integrated circuits (ASICs), one or more state machines, digital circuitry, or any other suitable circuitry.

Although FIG. 1 illustrates three customer computing devices 110, 112, 114, web serving system 100 can include any number of customer computing devices 110, 112, 114. Similarly, web serving system 100 can include any number of workstation(s) 106, servers 102, and databases 116.

Workstation(s) 106 are operably coupled to communication network 118 via router (or switch) 108. For example, workstation(s) 106 can communicate with server 102 over communication network 118. The workstation(s) 106 can allow for the configuration and/or programming of server 102, such as the controlling and/or programming of one or more processors of server 102. In some examples, server 102 may be a web server that hosts one or more webpages, such as a retailer's website. Workstation(s) 106 may be operable to access and program (e.g., configure) the webpages hosted by server 102.

Server 102 is also operable to communicate with database 116 over communication network 118. For example, server 102 can store data to, and read data from, database 116. Database 116 can be a remote storage device, such as a cloud-based server, a memory device on another application server, a networked computer, or any other suitable storage device. Although shown remote to server 102, in some examples database 116 can be a local storage device to server 102, such as a hard drive, a non-volatile memory, or a USB stick.

Communication network 118 can be a WiFix network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

Server 102 can also communicate with first customer computing device 110, second customer computing device 112, and Nth customer computing device 114 over communication network 118. Similarly, first customer computing device 110, second customer computing device 112, and Nth customer computing device 114 are operable to communicate with server 102 over communication network 118. For example, server 102 can receive data (e.g., messages) from, and transmit data to, first customer computing device 110, second customer computing device 112, and Nth customer computing device 114.

In some examples, server 102 and workstation(s) 106 can be operated by a retailer, while customer computing devices 110, 112, 114 can be computing devices operated by customers of a retailer. In some examples, server 102 hosts one or more webpages of a website. One or more of first customer computing device 110, second customer computing device 112, and Nth customer computing device 114 may be operable to load one or more of the webpages hosted by server 102 via, for example, the execution of a web browser. In some examples, customer computing devices 110, 112, 115 are operable to view and interact with a website hosted on server 102. For example, customer computing devices 110, 112, 115 may be operable to conduct a search on a website hosted by server 102 by communicating with server 102 over communication network 118.

Web serving system 100 allows for the providing, and displaying, of one or more webpages. For example, server 102 may host a plurality of webpages for a retailer's website. Customer computing devices 110, 112, 115 may execute a web browser that allows for the loading of webpages. A user may enter into an address bar of the web browser a web address of a webpage hosted by server 102 to request the webpage. Server 102 may determine the type of webpage requested, and provide a document, such as a Hypertext Markup Language (HTML) document, to the web browser based on the type of webpage requested. For example, server 102 may provide a first document in response to a webpage request for a first webpage of a web site, and may provide a second document, different than the first document, in response to a webpage request for a second webpage of the website. The document may be rendered by the web browser to display the corresponding webpage.

The provided documents may each contain instructions to download additional information, such as one or more files, such as script files (e.g., JavaScript® files). The additional information may be packaged in a bundle and hosted on server 102 or another server, such as a web server or a cloud-based server. The instructions for the first document provided in response to the webpage request for the first webpage may be different than the instructions for the second document provided in response to the webpage request for the second webpage. For example, while the first document may include instructions to download a first bundle, the second document may include instructions to download a second bundle.

As an example, server 102 may host webpages for a retailer's website. The website may include a first webpage that identifies a single item for sale, and a second webpage that identifies multiple items for sale. One or more of customer computing devices 110, 112, 115 may request, via the execution of a web browser, the first webpage or the second webpage from server 102. In response to a request for the first webpage, server 102 may provide a first HTML document that includes instructions to download a first bundle from a server that includes information related to the single item for sale on the first webpage. In response to a request for the second webpage, server 102 may provide a second HTML document that includes instructions to download a second bundle from the server that includes information related to the multiple items for sale on the second webpage.

As another example, server 102 may host webpages for a retailer's website. The web site may include a first webpage that allows a customer to add one item to an online shopping cart at a time, and a second webpage that allows the customer to add multiple items to the online shopping cart at one time. One or more of customer computing devices 110, 112, 115 may request, via the execution of a web browser, the first webpage or the second webpage from server 102. In response to a request for the first webpage, server 102 may provide a first HTML document that includes instructions to download a first bundle from a server. The first bundle may include information (e.g., one or more script files) that enables the first webpage to allow the customer to add the one item to the online shopping cart. In response to a request for the second webpage, server 102 may provide a second HTML document that includes instructions to download a second bundle from the server that includes information that enables the second webpage to allow the customer to add multiple items to the online shopping cart at one time.

Figure 2:
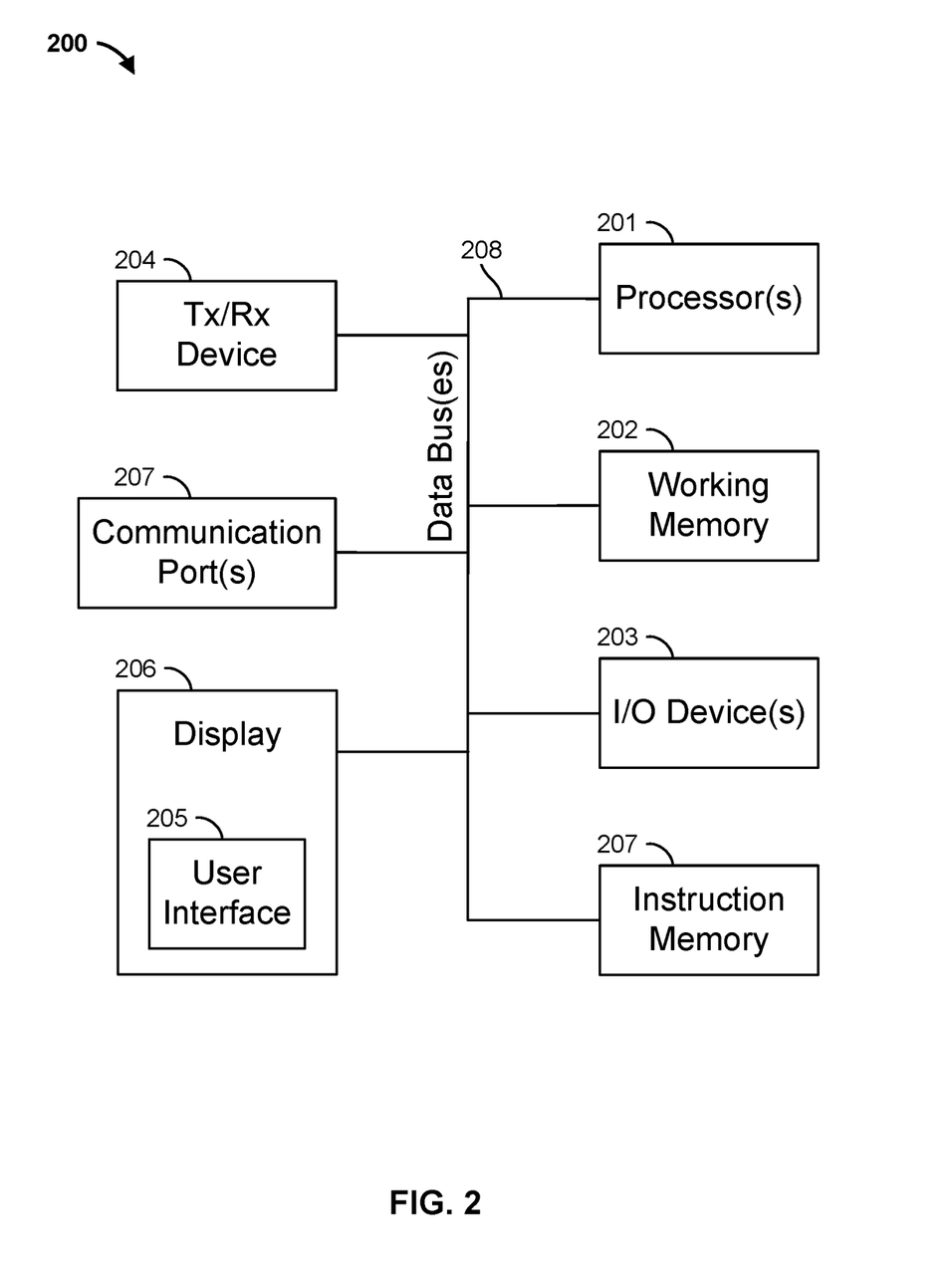
FIG. 2 is a block diagram of the server of the webpage serving system of FIG. 1, in accordance with some embodiments.

FIG. 2 illustrates server 102 of FIG. 1 in more detail. Server 102 can include one or more processors 201, working memory 202, one or more input/output devices 203, instruction memory 207, a transceiver 204, one or more communication ports 207, and a display 206, all operatively coupled to one or more data buses 208. Data buses 208 allow for communication among the various devices. Data buses 208 can include wired, or wireless, communication channels.

Processor(s) 201 can include one or more distinct processors, each having one or more cores. Each of the distinct processors can have the same or different structure. Processor(s) 201 can include one or more central processing units (CPUs), one or more graphics processing units (GPUs), application specific integrated circuits (ASICs), digital signal processors (DSPs), and the like.

Processor(s) 201 can be configured to perform a certain function or operation by executing code, stored on instruction memory 207, embodying the function or operation. For example, processor(s) 201 can be configured to perform one or more of any function, method, or operation disclosed herein.

Instruction memory 207 can store instructions that can be accessed (e.g., read) and executed by processor(s) 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processor(s) 201 can store data to, and read data from, working memory 202. For example, processor(s) 201 can store a working set of instructions to working memory 202, such as instructions loaded from instruction memory 207. Processor(s) 201 can also use working memory 202 to store dynamic data created during the operation of server 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 207 can include, for example, a serial port such as a universal asynchronous receiver/transmitter (UART) connection, a Universal Serial Bus (USB) connection, or any other suitable communication port or connection. In some examples, communication port(s) 207 allows for the programming of executable instructions in instruction memory 207. In some examples, communication port(s) 207 allows for the transfer (e.g., uploading or downloading) of data, such as data to be transmitted to and stored in database 116.

Display 206 can display user interface 205. User interfaces 205 can enable user interaction with server 102. For example, user interface 205 can be a user interface for an application executed by processor(s) 201. In some examples, a user can interact with user interface 205 by engaging input-output devices 203. In some examples, display 206 can be a touchscreen, where user interface 205 is displayed on the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 server 102 will be operating in. Processor(s) 201 is operable to receive data from, or send data to, a network, such as communication network 118 of FIG. 1, via transceiver 204.

Figure 3:
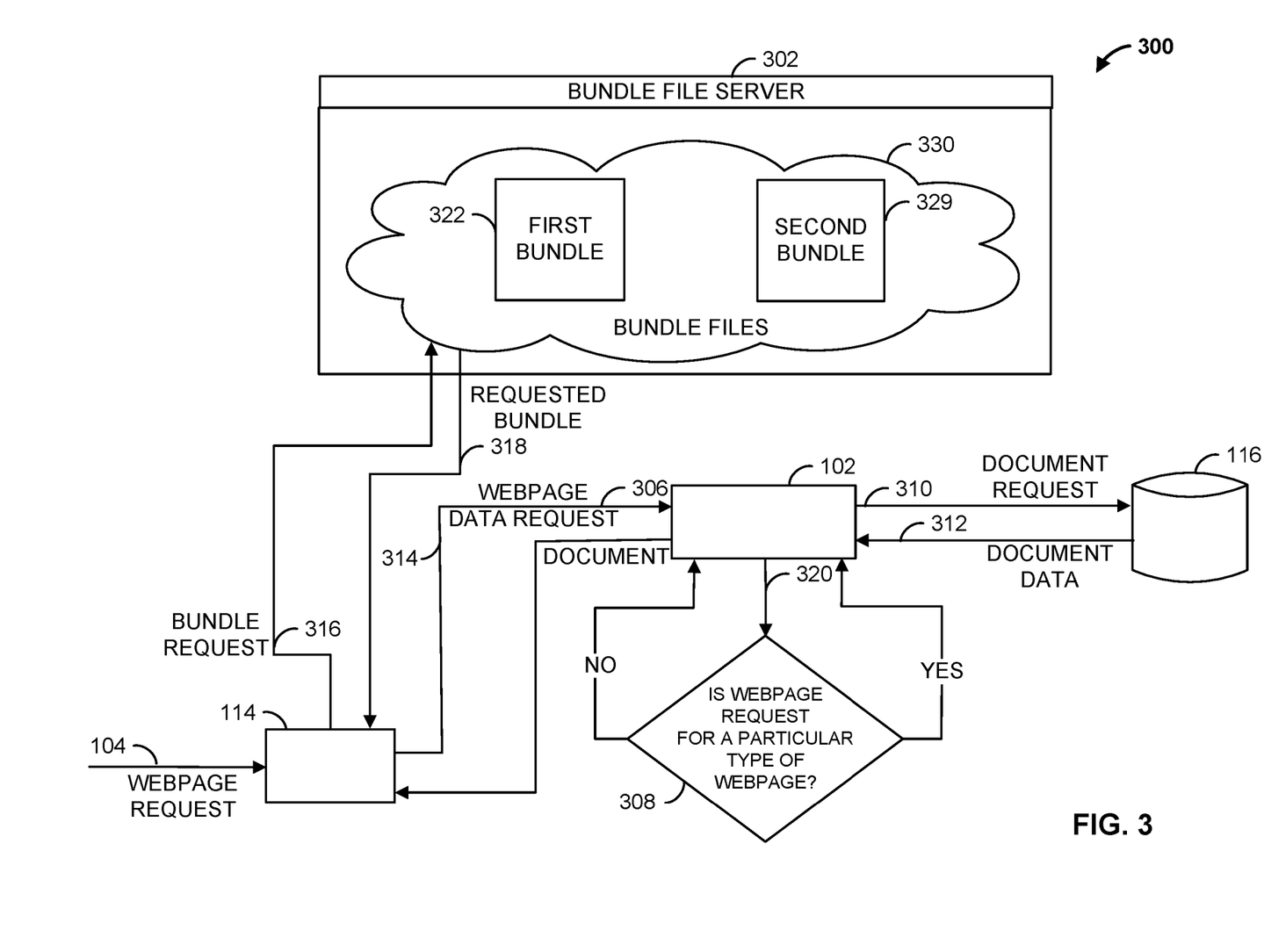
FIG. 3 is another block diagram of a webpage serving system, in accordance with some embodiments.

FIG. 3 illustrates a block diagram of a web serving system 300 that includes server 102, database 116, customer computing device 114, and a bundle file server 302. Bundle file server 302 may be any suitable server, such as a web server, a cloud-based server, or any other suitable storage device. Customer computing device 114 may receive a webpage request 304 to access a webpage, such as one hosted by server 102. For example, customer computing device 114 may execute a web browser. A user of customer computing device 114 may enter a web address of the webpage into an address bar of the web browser, and engage (e.g., click a search icon of) the web browser so that the web browser attempts to load the webpage. Upon receiving webpage request 304, customer computing device 114 transmits a webpage data request 306 requesting data, such as an HTML document, for the requested webpage.

The webpage data request 306 is received by server 102, which hosts the webpage. Server 102, in response to receiving webpage data request 306, determines whether the requested webpage is of a particular type. In this example, webpage type request 320 is provided to webpage type determination logic 308 of server 102 to determine whether the requested webpage is of the particular type. One particular type of webpage may include a webpage that allows a customer to add multiple items to an online shopping cart at one time. Another particular type of webpage may include a webpage that identifies multiple items for sale.

Webpage type determination logic 308 may receive webpage type request 320 identifying the requested webpage and obtain the type of webpage for the requested webpage from database 116. For example, database 116 may store data indicating the type of webpage for each webpage hosted by server 102. The data may be predefined and stored in database 116, for example. Webpage type determination logic 308 may determine whether the requested webpage is of a particular type by comparing the type of the requested webpage to the particular type. The particular type of webpage may be predefined, for example.

In some examples, webpage type request 320 includes data identifying the particular type of webpage that the type of the requested webpage is to be checked against. Based on the type of webpage obtained from database 116 for the requested webpage, webpage type determination logic 308 may determine whether the requested webpage is of the particular type identified by webpage type request 320. For example, webpage type determination logic 308 may compare the type of webpage obtained from database 116 for the requested webpage to the particular type of webpage identified by webpage type request 320. In response, webpage type determination logic 308 provides an indication (e.g., yes or no) of whether the requested webpage is of the particular type.

Based on the webpage type determination, server 102 may provide a document, such as an HTML document, to customer computing device 114. For example, server 102 may transmit a document request 310 to database 116 requesting document data identifying a document for the requested webpage based on the requested webpage's type as determined by webpage type determination logic 308. If webpage type determination logic 308 determines that the requested webpage is not of the particular type, server 102 may obtain document data from database 116 for one type of webpage (e.g., a default, or regular, webpage). Otherwise, if webpage type determination logic 308 determines that the requested webpage is of the particular type, server 102 may obtain document data from database 116 for that particular type of webpage. In other words, based on the type of requested webpage, server 102 obtains a corresponding document, such as an HTML document, for the requested webpage, where each type of webpage may have a corresponding document. Server 102 provides the document 314 to customer computing device 114.

Each document may include instructions to download a bundle, such as a bundle that includes JavaScript® files, from bundle file server 302. For example, each document may include instructions to download either first bundle 322, or second bundle 324. First bundle 322 may be a "base" bundle that may be used with "regular" webpages. Second bundle 324 may be a "special" bundle that may be used with particular types of webpages. For example, second bundle 324 may be used with webpages that allow a customer to add multiple items to an online shopping cart at one time. As another example, second bundle 324 may be used with webpages that identify multiple items for sale. Second bundle 324 may include more data for download that first bundle 322, for example. As a result, for webpages that do not include, or do not need, functionality provided by one bundle (e.g., second bundle 324), unused or unnecessary data is not downloaded. Instead, a different bundle (e.g., first bundle 322) is downloaded that includes only the data needed by those webpages.

In some examples, server 102 edits a document identified by the obtained document data with instructions to download a corresponding bundle. For example, server 102 may edit a document based on the type of webpage determined for the requested webpage. If webpage type determination logic 308 determines that the requested webpage is not of the particular type, server 102 may edit the document with instructions to download a first bundle (e.g., a default bundle, a "base bundle" for regular webpages). Otherwise, if webpage type determination logic 308 determines that the requested webpage is of the particular type, server 102 may edit the document with instructions to download a second bundle that corresponds to the particular type of webpage (e.g., a "special" bundle, such as one that corresponds to a website that allows a customer to add multiple items to an online shopping cart at one time).

Based on document 314, customer computing device 114 requests from bundle file server 302 a corresponding bundle for document 314. For example, customer computing device 114 may, via a browser, interpret (e.g., read) instructions provided by document 314 to download a bundle. The instructions may indicate that a bundle, such as first bundle 322 or second bundle 324, is to be downloaded from a server, such as bundle file server 302. For example, the instructions may indicate a web address of the server from which to download the bundle, and an identification of the bundle, such as a file name. Upon execution of the instructions, customer computing device 114 provides a bundle request 316 to bundle file server 302 identifying the bundle to download. In response, bundle file server 302 provides the requested bundle 318 to customer computing device 114. Customer computing device 114 may then display the webpage, such as by displaying the webpage on a web browser.

Figure 4:
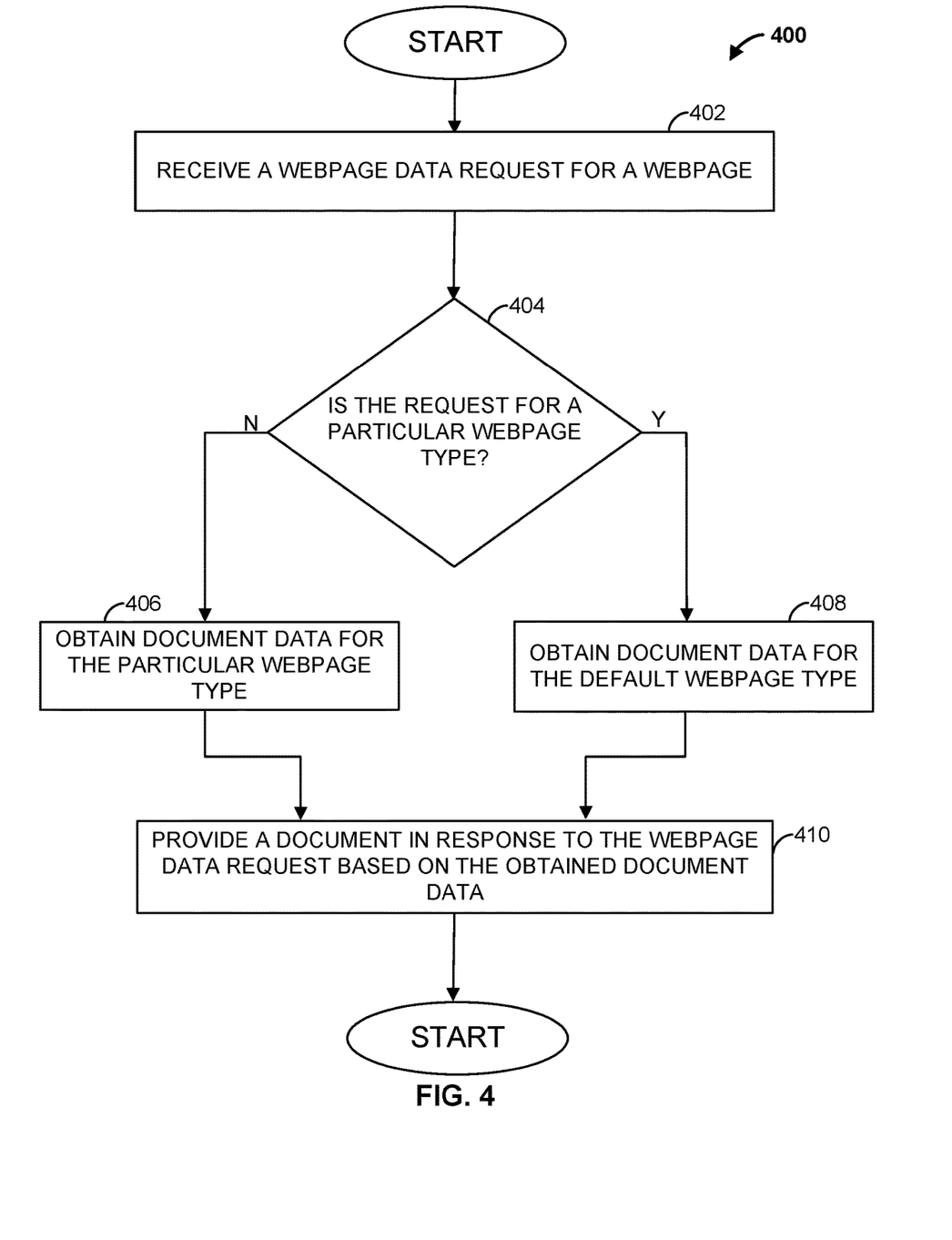
FIG. 4 is a flowchart of an example method that can be carried out by the webpage serving system of FIG. 1, in accordance with some embodiments.

FIG. 4 illustrates an example method 400 that can be carried out by, for example, the server 102 of FIG. 1. Beginning at step 402, a webpage data request for a webpage is received. For example, server 102 may receive webpage data request 306 from customer computing device 114. At step 404, a determination is made as to whether the webpage data request is for a particular type of webpage. For example, server 102 may determine whether webpage data request 306 is for a webpage that allows a customer to add multiple items to an online shopping cart at one time.

If the webpage data request is for the particular type of webpage, the method proceeds to step 406. At step 406, document data identifying a document for the particular webpage type is obtained. For example, server 102 may obtain document data from database 116 for a webpage that allows a customer to add multiple items to an online shopping cart at one time. The method then proceeds to step 410.

Back at step 404, if the webpage data request is not for the particular type of webpage, the method proceeds to step 408. At step 408, document data identifying a document for a webpage type that is not of the particular type is obtained. For example, server 102 may obtain document data from database 116 for a webpage that does not allow a customer to add multiple items to an online shopping cart at one time. The method then proceeds to step 410.

At step 410, the document identified by the obtained document data is provided in response to the webpage data request. For example, server 102 may transmit the document identified by the obtained document data, which may be an HTML document, to customer computing device 114.

Figure 5:
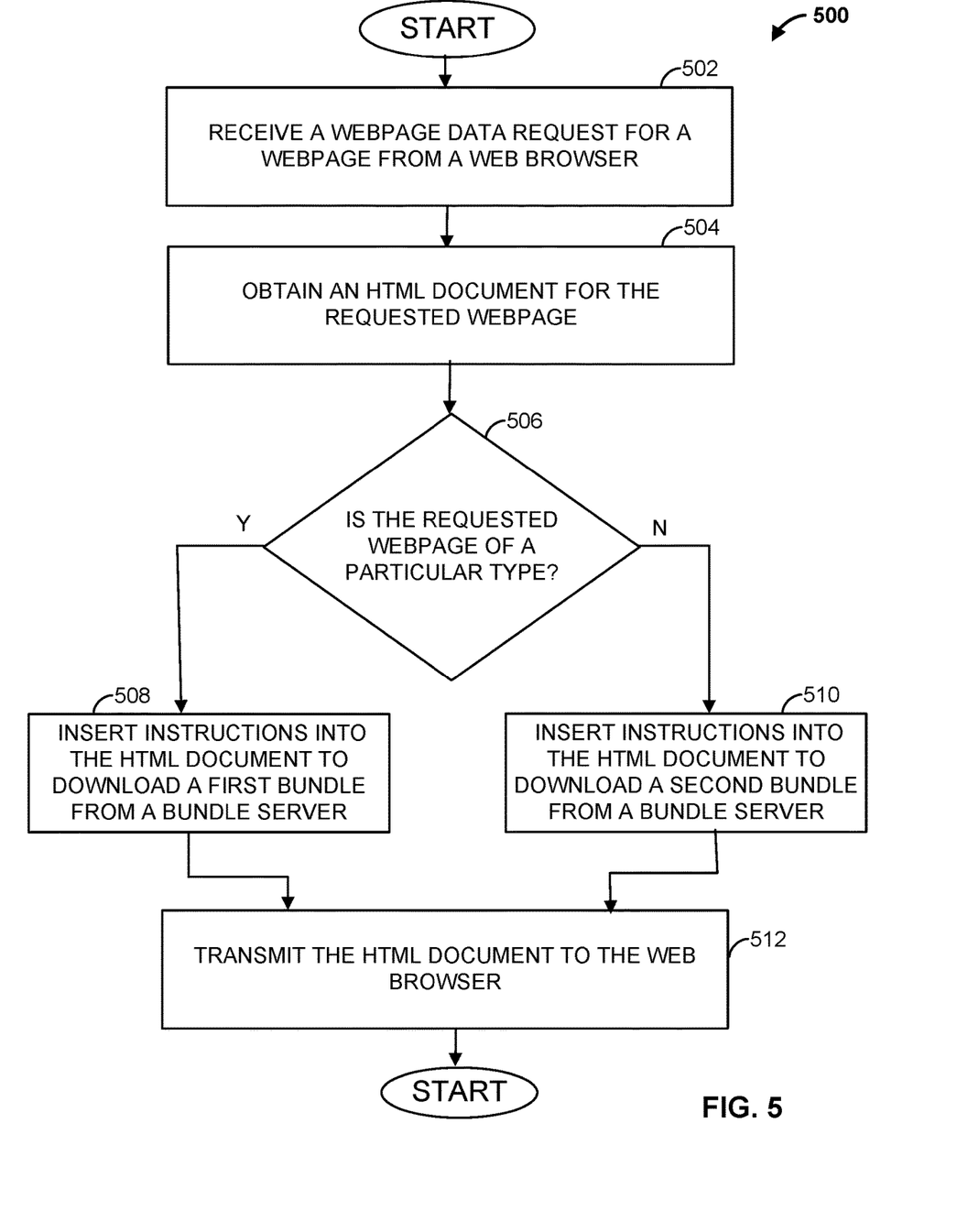
FIG. 5 is a flowchart of another example method that can be carried out by the webpage serving system of FIG. 1, in accordance with some embodiments.

FIG. 5 illustrates another example method 500 that can be carried out by, for example, the server 102 of FIG. 1. At step 502, a webpage data request for a webpage is received from a web browser. For example, server 102 may receive webpage data request 306 from a web browser executed by customer computing device 114. At step 504, an HTML document for the requested webpage is obtained. For example, server 102 may obtain the HTML document from database 116. At step 506, a determination is made as to whether the requested webpage is of a particular type. For example, server 102 may determine whether webpage data request 306 is for a webpage that allows a customer to add multiple items to an online shopping cart at one time.

If the webpage data request is for the particular type of webpage, the method proceeds to step 508. At step 508, instructions are inserted into the HTML document to download a bundle from a bundle server. For example, server 102 may insert instructions into the HTML document to download from bundle file server 302 second bundle 324 for a webpage that allows a customer to add multiple items to an online shopping cart at one time. The method then proceeds to step 512.

Back at step 506, if the webpage data request is not for the particular type of webpage, the method proceeds to step 510. At step 510, instructions are inserted into the HTML document to download a bundle from a bundle server. For example, server 102 may insert instructions into the HTML document to download from bundle file server 302 first bundle 322 for a webpage that does not allow a customer to add multiple items to an online shopping cart at one time. The method then proceeds to step 512.

At step 512, the HTML document is transmitted to the web browser. For example, server 102 may transmit document 312 to the web browser executed by customer computing device 114.

Figure 6:
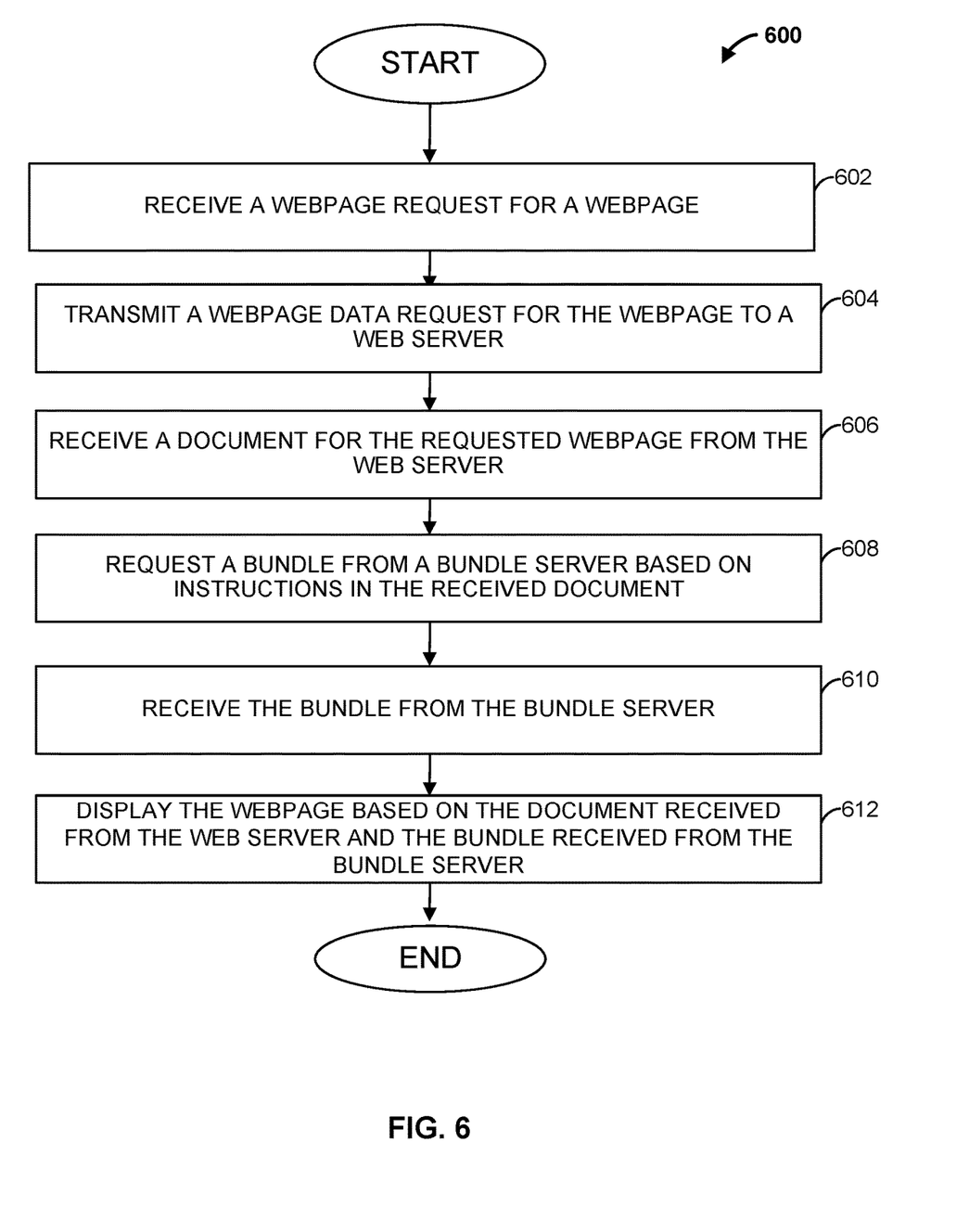
FIG. 6 is a flowchart of an example method that can be carried out by a customer computing device of FIG. 1, in accordance with some embodiments.

FIG. 6 illustrates an example method 600 that can be carried out by, for example, a customer computing device 110, 112, 114 of FIG. 1. Starting at step 602, a webpage request is received. For example, customer computing device 114 may receive webpage request 304 from a user operating customer computing device 114. Proceeding to step 604, a webpage data request for the webpage is transmitted to a server. For example, customer computing device 114 may transmit webpage data request 306 to server 102, requesting the webpage. At step 606, a document for the requested webpage is received from the server. For example, in response to transmitted webpage data request 306, customer computing device 114 may receive from the advertising server document 314. The document may be, for example, an HTML document.

Proceeding to step 608, a bundle is requested from a bundle server. The bundle requested is based on instructions received in the document. For example, customer computing device 114 may execute via, for example, a web browser, the instructions contained within the document, which instruct customer computing device 114 to download a bundle from bundle file server 302. Customer computing device 114 may then transmit to bundle file server 302 a bundle request 316 for the bundle.

At step 610, the bundle is received from the bundle server. For example, bundle file server 302 may transmit to customer computing device 114 requested bundle 318 in response to bundle request 316. Upon receiving the requested bundle, at step 612, the requested webpage is displayed. The displayed webpage is based on the document received from the web server, and the bundle received from the bundle server. For example, customer computing device 114 may display the webpage for webpage request 304 based on document 314 and requested bundle 318.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a generalpurpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
a computing device configured to:
receive a webpage data request for a webpage from a second computing device;
determine, based on the webpage data request, a webpage type of a plurality of webpage types for the webpage;
obtain, based on the determined webpage type, a first document that identifies a bundle corresponding to the webpage type, each webpage type of the plurality of webpage types is associated with a corresponding document of a plurality of documents, the bundle includes data needed to render the webpage;
edit the first document by inserting instructions into the first document to cause the second computing device to transmit a bundle request to a third computing device to download the bundle when the inserted instructions are read by the second computing device, the inserted instructions include a web address of the third computing device from which to download the bundle and an identification of the bundle; and
transmit the first document identifying the bundle to the second computing device.

2. The system of claim 1, wherein the computing device is configured to:
determine whether the webpage type for the webpage is a first webpage type or a second webpage type;
identify the bundle based on the webpage type; and
determine the first document based on the identified bundle.

3. The system of claim 2, wherein the computing device is configured to:
identify a first bundle corresponding to the first webpage type if the webpage type for the webpage is the first webpage type; and
identify a second bundle corresponding to the second webpage type if the webpage type for the webpage is the second webpage type.

4. The system of claim 3, wherein the computing device is configured to:
insert instructions into the first document identifying the first bundle corresponding to the first webpage type if the webpage type for the webpage is the first webpage type; and
insert instructions into the first document identifying the second bundle corresponding to the second webpage type if the webpage type for the webpage is the second webpage type.

5. The system of claim 1, wherein the first document to be rendered to display the webpage is a Hypertext Markup Language document.

6. The system of claim 1, wherein the bundle corresponding to the webpage type comprises at least one script file.

7. The system of claim 1, wherein the computing device is configured to:
determine the bundle corresponding to the webpage type based on a predefined list that associates each of the plurality of documents with at least one bundle;
identify, in a database, the first document comprising the bundle corresponding to the webpage type; and
obtain, from the database, the first document to be rendered to display the webpage.

8. The system of claim 1, wherein the webpage type allows a customer to add multiple items to an online shopping cart at one time.

9. A method by a computing device comprising:
receiving a webpage data request for a webpage from a second computing device;
determining, based on the webpage data request, a webpage type of a plurality of webpage types for the webpage;
determining, based on the determined webpage type, a first document that identifies a bundle corresponding to the webpage type, each webpage type of the plurality of webpage types is associated with a corresponding document of a plurality of documents, the bundle includes data needed to render the webpage;
editing the first document by inserting instructions into the first document to cause the second computing device to transmit a bundle request to a third computing device to download the bundle when the inserted instructions are read by the second computing device, the inserted instructions include a web address of the third computing device from which to download the bundle and an identification of the bundle; and
transmitting the first document identifying the bundle to the second computing device.

10. The method of claim 9 wherein:
determining the webpage type for the webpage comprises determining whether the webpage type for the webpage is a first webpage type or a second webpage type; and
determining the first document comprises:
identifying the bundle based on the webpage type; and
determining the first document based on the identified bundle.

11. The method of claim 10 wherein identifying the bundle based on the webpage type comprises:
identifying a first bundle corresponding to the first webpage type if the webpage type for the webpage is the first webpage type; and
identifying a second bundle corresponding to the second webpage type if the webpage type for the webpage is the second webpage type.

12. The method of claim 11 comprising:
inserting instructions into the first document identifying the first bundle corresponding to the first webpage type if the webpage type for the webpage is the first webpage type; and
inserting instructions into the first document identifying the second bundle corresponding to the second webpage type if the webpage type for the webpage is the second webpage type.

13. The method of claim 9 wherein the first document to be rendered to display the webpage is a Hypertext Markup Language document.

14. The method of claim 9 wherein the bundle corresponding to the webpage type comprises at least one script file.

15. The method of claim 9 comprising:
  determining the bundle corresponding to the webpage type based on a predefined list that associates each of the plurality of documents with at least one bundle;
  identifying, in a database, the first document comprising the bundle corresponding to the webpage type; and
  obtaining, from the database, the first document to be rendered to display the webpage.

16. The method of claim 9 wherein the webpage type allows a customer to add multiple items to an online shopping cart at one time.

17. A non-transitory, computer-readable storage medium comprising executable instructions that, when executed by one or more processors, cause the one or more processors to:
  receive a webpage data request for a webpage from a second computing device;
  determine, based on the webpage data request, a webpage type of a plurality of webpage types for the webpage;
  determine, based on the determined webpage type, a first document that identifies a bundle corresponding to the webpage type, each webpage type of the plurality of webpage types is associated with a corresponding document of a plurality of documents, the bundle includes data needed to render the webpage;
  edit the first document by inserting instructions into the first document to cause the second computing device to transmit a bundle request to a third computing device to download the bundle when the inserted instructions are read by the second computing device, the inserted instructions include a web address of the third computing device from which to download the bundle and an identification of the bundle; and
  transmit the first document identifying the bundle to the second computing device.

18. The computer-readable storage medium of claim 17, wherein the executable instructions, when executed by the one or more processors, cause the one or more processors to:
  determine whether the webpage type for the webpage is a first webpage type or a second webpage type;
  identify the bundle based on the webpage type; and
  determine the first document based on the identified bundle.

19. The computer-readable storage medium of claim 18, wherein the executable instructions, when executed by the one or more processors, cause the one or more processors to:
  identify a first bundle corresponding to the first webpage type if the webpage type for the webpage is the first webpage type; and
  identify a second bundle corresponding to the second webpage type if the webpage type for the webpage is the second webpage type.

20. The computer-readable storage medium of claim 17, wherein the executable instructions, when executed by the one or more processors, cause the one or more processors to determine that the webpage type allows a customer to add multiple items to an online shopping cart at one time.

* * * * *